Patented Nov. 26, 1935

2,022,470

UNITED STATES PATENT OFFICE 2,022,470

PROCESS OF MAKING PECTOUS MATERIAL AND PRODUCT

Herbert T. Leo, Clarence C. Taylor, and Frederick A. Beck, Anaheim, Calif.

No Drawing. Application October 16, 1933, Serial No. 693,892

5 Claims. (Cl. 99—11)

This invention relates to a process of making pectous material and to the product thereby produced. More particularly, the invention relates to the preparation of a dry, standardized mixture of finely divided fibrous material containing pectose in substantially its original state and a filter aid, such as diatomaceous earth.

It has previously been suggested (Beylik Patent No. 1,393,660) that a dry, fibrous material containing pectose uniformly distributed throughout the cells of the fiber, could be obtained by dissolving from comminuted fruit pulp and the like the alcohol soluble constituents of the fruit pulp. Such a process, however, has the disadvantage that it is relatively expensive, as compared with our present process, and also that it does not remove a number of water-soluble substances as completely as is desirable.

According to our present process, the water-soluble ingredients of fruit pulp are removed by simply washing and extracting with water and then pressing the extracted mass with the help of a filter aid under considerable pressure. The product so produced, comprising a mixture of fibrous vegetable tissues containing the original pectose content, and the filter aid, is then standardized to a definite jell strength and may be used in the making of jellies and the like by subjecting the mixture to an acid digestive treatment. This is necessary, since the pectous material in the dry standardized product is in a water insoluble form and must be first hydrolyzed by means of an acid digestive step in order to render the pectous material available for jelly making purposes.

It is therefore an object of this invention to provide a relatively economical and simple method for the preparation of a dry, standardized pectous product containing fibrous material with the original pectose content distributed therein, and a filter aid to assist in the subsequent extraction of the available pectin content upon acid digestion of the mixture.

It is a further important object of this invention to provide a dry, standardized pectous material having an insoluble pectose content that may be rendered easily available by digestion of the material with an acid.

It is a further important object of this invention to provide a mixture of pectous material and a filter aid to assist in the subsequent extraction of the pectin formed by hydrolysis of the pectose in an acid digestion treatment.

Other and further important objects of this invention will become apparent from the following description and appended claims.

Various pectose bearing fruit and vegetable materials may be used as the raw material for making our product. Oranges, lemons, limes and grapefruits all contain large quantities of pectose, the mother substance that yields pectin upon hydrolysis. In addition to these citrus fruits, our invention also includes the use of apples, or apple pomace, as a source of pectose.

Heretofore pectin has been obtained from these citrus fruits and apples by extracting the fruit pulp with an aqueous acid solution to effect hydrolysis of the pectose. After hydrolysis, the digested fruit pulp had been subjected to filtration and the pectin content of the filtrate had been precipitated with either aluminum hydroxide or with alcohol, and subsequently purified. These steps have all been necessary in order to avoid contaminating the final product with the very strong flavors, and especially the bitter oils that always appear in citrus fruits.

According to our present process, the citrus fruit or apple pomace, or other source of pectose, is pressed to remove the juices and also the oils. The mass is then ground very fine and washed repeatedly with water at the usual tap temperatures in any convenient apparatus. This washing process should be done rapidly and at as low temperatures as are readily available, in order to avoid fermentation due to enzymic action.

The diatomaceous earth is then added in sufficient quantity to assist in the filtration and pressing of the pulp mass to remove as much as possible of the liquid content. By diatomaceous earth is meant any of the various forms of infusorial earth, kieselguhr and the like that are commonly used as filter aids and sold under various trademarks, such as "Hypocel."

The amount of diatomaceous earth used may vary from one pound to ten pounds for each ten gallons of drained, water-washed fruit pulp. The variation in the quantity of diatomaceous earth takes into account the texture and condition of the fruit. When slimy, and hard to press, more diatomaceous earth is necessary.

Inasmuch as alkaline conditions are harmful to pectous materials, it may be necessary at this stage to add a slight acidity to the peel, or fruit pulp. We have also found that enzymes destroy and digest citrus peels very readily, so that to prevent this, it is desirable, but not absolutely necessary, to add sulphurous acid, either added as such or formed by the action of sulphur dioxide on the water present in the mass. When a long period of time elapses between pressing and drying, it is impossible to prevent enzymic action without taking some such positive step as this.

The wet pulpy mass, with the earth material admixed therewith, is now run into a press and pressed out thoroughly. Great pressure may be exerted with the earth material present and a larger proportion of liquid content may therefore be extracted. We prefer to use the type of press and filter described in the Herbert T. Leo application Serial No. 669,114, filed May 3, 1933.

The pressed cake is then disintegrated and quickly dried at a temperature sufficiently low to prevent complete dehydration of the cellulose tissues. It is preferable to leave a few percent say 3 or 4%, of moisture in the dried pulpy mass, since otherwise it is extremely difficult to wet the fibrous material in the subsequent digestion treatment. Any efficient and convenient drier may be employed, but we prefer to use a rotary drier with heated air and to use a steam jacketed or otherwise heated shell.

The dried material contains varying amounts of diatomaceous earth and also, depending upon the raw material used, varying proportions of pectose. In order to establish the pectin value of the product, and standardize it for jelly strength, we use the following method:

For instance, 30 grams of the dry fibrous material is admixed with 1000 cc. water, the mass brought to a boil and an acid, preferably hydrochloric, added. The added hydrochloric acid, together with any fruit acid present or added thereto, should be sufficient to bring the pH value within the relatively narrow range of 2.40 to 2.65. A lower pH value is conducive of producing too much pectic acid and a pH above 2.65 will not extract pectin efficiently.

The acidified mass is heated for half an hour at boiling temperature or thereabouts and then pressed out in a small fruit bag press. Since the hot pectin liquor is too strongly acid for jelly making, the acidity is partially neutralized by the addition of about 6 cc. of sodium acetate solution containing 1 gram of sodium acetate to each 4 cc. of solution, based upon 1000 cc. of extract.

350 cc. of the partially neutralized extract is then measured out and 500 grams of sugar (ordinary cane sugar) are added thereto. The resulting mass is boiled down to a weight of exactly 770 grams and poured into 8 ounce tumblers, to which have previously been added 4 cc. of 50% citric acid solution. The liquid in the tumblers is stirred quickly and then allowed to stand. Jelly will form immediately.

If the jelly is too weak after standing 12 hours, increasing amounts of extract with 500 grams of sugar are tried out, always boiling the liquid mass to exactly 770 grams before pouring into the tumblers. When the right texture of jelly is reached, as determined by the usual jelly makers' test, the grade of peel, or fruit pulp, is figured as follows:

$$\frac{\text{Amount of liquid used for jelly making}}{\text{Total extract from peel}} = \frac{500}{X}$$

where X is the number of grams of sugar the total amount of extract will jell. Consequently, $$\frac{X}{\text{Number of grams of fruit peel, or pulp, cooked}} = \text{Grade of the peel}$$

In order to standardize the peel to some predetermined strength, either pectous material of higher and known strength is mixed therewith, or some inert material like diatomaceous earth or a sugar, such as cerelose, is added.

The thus standardized product may be effectively used for its available pectin content by extracting the pectin formed as a result of the hydrolysis of pectose according to an acid digestion treatment, such as above described. The actual extraction of the pectin solution may be best effected in a type of press, such as described in the application of Herbert T. Leo above referred to. If the conditions outlined above for extraction of the pectin be followed, such as the use of a pH range between 2.40 and 2.65, time of boiling, etc., a liquid pectin solution of known jell strength and of predetermined pH value will be obtained. This pectin solution may be used directly in the manufacture of jellies and the like, or for other purposes for which pectin is usually employed.

It will be noted that the diatomaceous earth serves not only as a filter aid in the filtering and pressing of the fruit pulp or pomace, but also in the extraction of the available pectin content from the dry, powdered fibrous material of our standardized product. The diatomaceous earth also serves in the extraction of the oils and flavor from the fruit peel or pomace by absorbing and retaining a certain amount of such oils and flavors, thereby making it possible to remove the bitter oils from citrus fruits without the use of organic solvents. In addition to these functions, the diatomaceous earth also serves in the final product as a diluent, by means of which the product may be standardized to a definite jell strength.

In order to obtain uniform results, it is important to follow the conditions specified for the standardization of our product. These conditions include the following:

1. pH of the mass during extraction of the pectin content.
2. Time of boil.
3. Size of fibrous cellulose particle.
4. Quantity of diatomaceous earth present in the mixture.
5. Proportion of pectous bearing materials and sugar.
6. Percent of extraction of pectin.

It will be appreciated that our products are different from the product of the Herbert T. Leo Patent No. 1,838,949 in that the fibrous cellulose particles are not ground to colloidal size nor is the pectin present in a water soluble form. Rather instead, the fibrous content of our product is of a sufficient size to render filtration relatively simple and easy of accomplishment when a filter aid, such as diatomaceous earth, is used. In our product, the potentially available pectin is present in the form of water insoluble pectose, which, upon subsequent hydrolysis in an acid digestion, is converted into water soluble pectin.

If desired, some of the diatomaceous earth may be removed from the dried product before standardization by grinding and sifting the material through a screen over 40 mesh, and preferably from 60 to 100 mesh. The earth material can then be used over and over again, as it loses none of its properties. By removing most of this earth material, it is possible to standardize the product and save subsequent freight charges on this excessive weight.

We are aware that numerous details of the process may be varied through a wide range without departing from the principles of our invention, and we therefore do not purpose limiting the patent granted hereon otherwise than is necessitated by the prior art.

We claim as our invention:

1. The process of preparing a pectous product which comprises finely grinding fruit pomace to a size greater than colloidal size, washing the ground mass to remove water soluble materials therefrom, said washing operation being effected at low temperatures to prevent enzymic action, adding a filter aid to the washed mass, pressing the resulting mixture to remove liquid therefrom, disintegrating the resulting pressed paste, rapidly drying the disintegrated mass at a temperature sufficiently low to prevent complete dehydration of the cellulose tissue therein and standardizing the mass to a product of definite jell strength by regulating the amount of filter aid present therein.

2. The process of preparing a pectous product which comprises pressing pectose containing fruits or vegetables to remove juices and oils therefrom, finely grinding the pressed mass to a size greater than colloidal size, repeatedly washing the ground mass to remove water soluble materials therefrom, said washing operation being effected at low temperatures to prevent enzymic action, adding a filter aid to the washed mass, pressing the resulting mixture to remove liquid therefrom, disintegrating the resulting pressed paste, rapidly drying the disintegrated mass at a temperature sufficiently low to prevent complete dehydration of the cellulose tissue therein and standardizing the mass by removing some of the filter aid to obtain a product of definite jell strength.

3. The process of preparing a pectous product which comprises pressing pectose containing fruits or vegetables to remove juices and oils therefrom, finely grinding the pressed mass to a size greater than colloidal size, repeatedly washing the ground mass to remove water soluble materials therefrom, said washing operation being effected at low temperatures to prevent enzymic action, adding diatomaceous earth to the washed mass, acidifying the resulting mixture with a weak acid to prevent enzymic action, pressing the mixture to remove as much of the liquid therefrom as possible, disintegrating the resulting pressed paste, rapidly drying the disintegrated mass at a temperature sufficiently low to prevent complete dehydration of the cellulose tissue therein and standardizing the product to a definite jell strength with predetermined amounts of diatomaceous earth.

4. A pectous product comprising a dry powdered mixture of greater than colloidal size comprising fibrous crushed fruit or vegetable cellulose tissue containing substantially the original content of water insoluble pectose substantially free from water soluble substances and bitter components of the original fruit or vegetable, and a filter aid in an amount sufficient to standardize the product to a definite jell strength.

5. A dry powdered pectous product of greater than colloidal size and of standardized jell strength comprising a mixture of diatomaceous earth and finely comminuted citrus fruit peel containing substantially its original pectose content but substantially free from water soluble substances and bitter components of the original citrus fruit peel.

CLARENCE C. TAYLOR.
FREDERICK A. BECK.
HERBERT T. LEO.